United States Patent [19]
Seki et al.

[11] Patent Number: 5,711,913
[45] Date of Patent: Jan. 27, 1998

[54] BIAXIAL ORIENTATION BLOW MOLDING METHOD AND PREFORM HOLDING JIG

[75] Inventors: Nobuichi Seki; Masanori Kimura; Yoshiyuki Ichizawa, all of Tokyo; Yukio Koshidaka, Matsudo, all of Japan

[73] Assignee: Yoshino Kogyosho Co., Ltd., Tokyo, Japan

[21] Appl. No.: 564,192
[22] PCT Filed: Apr. 28, 1995
[86] PCT No.: PCT/JP95/00853
  § 371 Date: Dec. 18, 1995
  § 102(e) Date: Dec. 18, 1995
[87] PCT Pub. No.: WO95/29804
  PCT Pub. Date: Nov. 9, 1995

[30] Foreign Application Priority Data

Apr. 28, 1994 [JP] Japan .................... 6-092358

[51] Int. Cl.⁶ .................................... B29C 49/28
[52] U.S. Cl. .................. 264/532; 264/537; 264/523; 425/522; 425/529; 425/533
[58] Field of Search ................... 264/523, 532, 264/535, 537; 425/529, 534, 533

[56] References Cited

FOREIGN PATENT DOCUMENTS 58-84734  5/1983  Japan ........................... 264/532
4-2035    1/1992  Japan.

*Primary Examiner*—Catherine Timm
*Attorney, Agent, or Firm*—Oliff & Berridge PLC

[57] ABSTRACT

The present invention is intended to prevent the deformation of a cylindrical mouth portion of a preform when a blow pressure acts thereon in a diameter expanding direction during biaxial orientation blow molding. During biaxial orientation blow molding, sealing of the blow pressure is accomplished by means of a neck ring P1 circumferentially provided on a lower end of the circumferentially provided on a lower end of the circumferential surface of a cylindrical mouth portion P2 of a preform to thereby make the blow pressure act uniformly on the whole area of the cylindrical mouth portion P2, whereby the unreasonable deformation of the cylindrical mouth portion P2 due to the ununiform application of blow pressure thereto can totally be eliminated.

9 Claims, 5 Drawing Sheets

BIAXIAL ORIENTATION BLOW MOLDING METHOD AND PREFORM HOLDING JIG

FIELD OF INVENTION

The present invention relates to biaxial oriented blow molding method for manufacturing a synthetic resin bottle by drawing a so called preform, a cylinder with a bottom preformed by synthetic resin, with a draw bar or air to biaxial orientation, and a structure of a preform holding jig used for the molding method.

DESCRIPTION OF PRIOR ART

Synthetic resin bottles formed by biaxial orientation blow molding, especially ones made of polyethylene teraphthalate resin are used in various fields, as they have many superior characteristics.

The synthetic resin bottle formed by biaxial oriented blow molding, in general, is made from a cylindrical preform with a bottom, using injection molding method. The bottle is shaped by drawing the preform axially and radially when it is heated to the temperature that it becomes elastic. The preform P has a cylindrical shape having a bottom, like a test tube, and a cylindrical mouth portion. Around the cylindrical mouth portion, normally, is a thread groove to screw on a cap. Further surrounding below the cylindrical mouth portion is an integrated jaw-like neck ring.

Such preform P is loosely fitted to a cylinder guide 10 of a preform holding jig 5, shown in FIG. 4 with the cylindrical mouth portion at the bottom. While held in this position, the preform P is heated to the temperature which the preform P becomes elastic. The heated preform P is then inserted to a blow metal mold 1 with the preform holding jig 5.

The blow metal mold comprises a cavity of the same shape of a bottle to be formed, an attaching concavity for the holding jig which has an insertion opening to insert the main body of the preform into the cavity, and a neck supporting jaw 3 inside the cavity and in contact with the neck ring P1 of the preform P for cooperating with the holding jig 5 in fixing the preform P to the metal mold.

The center of the holding jig 5 is provided with a draw bar insertion hole 11, penetrating the holding jig, therein. When the preform is set in the metal mold, a draw bar 16 is inserted through the draw bar insertion hole 11, presses with its tip the bottom of the preform, heated and now elastic deformable, and stretches the preform to the axial direction. Simultaneously, blow air will be forced in through the draw bar insertion hole 11 or through an air supply hole on the draw bar 16. The blow air draws the preform radially, thereby forming a bottle P'.

When molding the preform P into the bottle P' by biaxial oriented blow molding, a sealing will be necessary in order to prevent the blow air pressed inside the preform P from leaking from the metal mold. The sealing will be achieved according to the method stated below.

First, a seal ring 15 is installed to the base of a guide cylinder 10 of the holding jig 5. The preform held by the holding jig 5 is inserted into the cavity of the metal mold, and the holding jig 5 is attached to the attaching concavity 4 of the blow metal mold 1. Then force pushing the neck supporting law 3 downward pushes the preform P closely to an open end of the cylindrical mouth portion P2 of the preform P, thereby completing the sealing.

The blow pressure required for the biaxial oriented blow molding to mold the preform P into the bottle P', depending on the dimension of the preform P and/or on the percent of stretch to the bottle P' to be molded, generally is equals to or greater than 20 Kgf/cm2. In case of double stage blow molding where the blow molding of the preform P to the bottle P' is divided into 2 stages, the blow pressure required increases to 30–40 Kgf/cm2 or more.

As stated, a powerful blow pressure is applied to the preforms when molding the preforms into bottles using biaxial oriented blow. In regard to this point, the conventional technique has achieved the sealing by closely contacting the open end of the cylindrical mouth portion P2 of preform P to the seal ring; therefore, the enormous blow pressure is applied not only to the body of the preform but also to the cylindrical mouth portion. Thus, the size of the cylindrical mouth portion of the preform also expands and deforms due to the large blow pressure.

Even if the cylindrical mouth portion of the preform is pre-crystallized or whitened and the cylindrical mouth portion is reinforced and more resistant to deformation, the cylindrical mouth portion still tends to deform as the portion is also heated to a certain temperature. The cylindrical mouth portion, due to the strong blow pressure acting inside towards the cylindrical mouth portion, thus expands it to radial direction.

As the cylindrical mouth portion with the thread groove, especially, contains thinner parts because of the groove, the thin parts are easily deformed with the blow pressure. Therefore, the diameter expansion of the cylindrical mouth portion occurs even more frequently.

In order to increase the resistance, thickening of the cylindrical mouth portion of the preform can be anticipated. However, the cylindrical mouth portion is still heated even though it is thickened. As long as the blow pressure is applied to the cylindrical mouth portion, it is impossible to totally eliminate the deformation of the cylindrical mouth portion. Further, increasing the thickness of the cylindrical mouth portion is uneconomical as increased amount of synthetic resin material will be required to mold one bottle.

SUMMARY OF THE INVENTION

The object of the present invention is to assure the prevention of expansion of the cylindrical mouth portion due to the blow pressure and to obtain a bottle molded with superior accuracy when a cylindrical preform with a bottom made of synthetic resin having the integrate neck ring P1 around the lower portion of the cylindrical mouth portion is molded with biaxial oriented blow molding method.

The method according to the present invention prevents the enormous blow pressure from acting on the cylindrical mouth portion to draw only outward when molding the preform into a bottle using biaxial oriented blow molding method. The present invention devised that the blow pressure is applied at least to both inside and outside of the cylindrical mouth portion when molding the preform into a bottle using biaxial oriented blow molding method.

As one of the example of the method of applying, the blow pressure to inside and outside of the cylindrical mouth portion, from the point of view of achieving it by the sealing of the blow pressure, there is a method for achieving the sealing of blow pressure by placing a neck ring underneath and around the cylindrical mouth portion.

As the present invention equalizes the blow pressure at the inside and outside of the cylindrical mouth portion, the sealing does not necessary have to occur at the neck ring. In practice, it is just most practical and most appropriate to seal at the neck ring portion.

A passage to guide the blow pressure to the outside of the cylindrical mouth portion may be formed in the preform holding jig.

The best preform holding jig for achieving the aforementioned method comprises:

a jig body with an draw bar insertion hole penetrating in the center thereof through which the draw bar slides up and down, and a holding cylinder vertically positioned around the jig body, in which the cylindrical mouth portion of the preform can be loosely fitted upside down, having a sealing portion which comes into contact with and stages the neck ring of the cylindrical mouth portion, and shaped in a way to keep the air inside and outside the cylindrical mouth portion communicating when the cylindrical mouth portion is fitted.

The holding cylinder preferably has a inner diameter which is wider than the outer diameter of the cylindrical mouth portion and smaller than the outer diameter of the neck ring. On the other hand, the inner diameter of the holding cylinder may be formed larger than the outer diameter of the neck ring, a protruding seal portion may be provided on the inner surface of the holding cylinder to come into contact with and stage the neck ring.

It is preferable to form a guide cylinder on the holding jig and inside the holding cylinder, in a manner that it may be inserted inside the cylindrical mouth portion of the preform when the preform is installed onto the holding jig.

In order to secure the installation of the preform to the holding jig, the guide cylinder preferably is shaped to extend the draw bar insertion hole upward, has an outer diameter smaller than the inner diameter of the cylindrical mouth portion of the preform, and is high enough to project upward out of the holding cylinder.

The holding cylinder may be integrated on the jig body, but also may be formed separately to be put on to attach to the Jig body. In the latter instance, the attached portion of the jig body and the holding cylinder should be preferably sealed airtight by a seal ring.

The blow pressure is sealed by the union of the holding cylinder and the neck ring. The cylindrical mouth portion of the preform is loosely inserted inside the holding cylinder, and equal amount of blow pressure is applied to all surface of the cylindrical mouth portion, as the space inside and outside of the cylindrical mouth portion is communicating, making the entire cylindrical mouth portion exposed in the a blow-pressurized atmosphere.

Thus, the possibility of expansion and deformation of the cylindrical mouth portion due to unequal pressure on the cylindrical mouth portion of the preform is completely eliminated when molding the preform into the bottle with the biaxial oriented blow.

The blow metal mold comprises a cavity of the shape of the bottle to be molded, an attaching concavity on which the preform holding jig is fitted as well as serving as the preform insertion hole, and a neck supporting jaw inside of the attaching concavity which comes in contact with the neck ring of the preform and fixes the preform together with the holding jig to the metal mold.

Before installing the preform to the metal mold, the preform is positioned onto the holding jig standing upside down with its cylindrical mouth portion is loosely fitted into the holding cylinder. The neck ring of the preform is placed in a position that it can hermetically touch the sealing portion of the holding cylinder.

When the holding jig with the preform installed is put through the attaching concavity of the blow metal mold, the neck ring of the preform becomes griped between the neck supporting jaw of the blow metal mold and the sealing portion of the holding cylinder of the holding jig due to the attaching force of the holding jig acting against the blow metal mold, thereby the blow pressure seals the seal brim and the neck ring. The sealing force created here exceeds the blow pressure.

As the cylindrical mouth portion of the preform loosely fits into the holding cylinder, an ample gap for allowing the blowing pressure fluid (blowing air) to move freely enough will be created between the cylindrical mouth portion and the holding cylinder.

For example, in the production line, a plurality of holding jigs are installed and conveyed on an endless conveyer belt by way of a blow molding machine. During the process of the conveyance, the preforms are fitted on the holding jaw, and then the holding jigs and the preforms are carried together. In the conveying route, there is a heating equipment in which the preforms are heated. The heated preforms together with the holding jigs then are fitted into the metal mold of the blow molding machine, after which the preforms are blow molded into bottles.

When treating the preforms with heat, the holding cylinder, covering the cylindrical mouth portion of the preforms, blocks the cylindrical mouth portion from the radiation heat. Therefore, the degree of heating is far lower than the body as the main part, thereby maintaining the cylindrical mouth portion more resistant to deformation.

The preform material used in the present invention may be any type of synthetic resin that is capable of being molded.

DESCRIPTION OF PREFERRED EMBODIMENTS

The present invention will be further described in detail with regard to embodiments as examples.

<First Embodiment>

Figure 1:
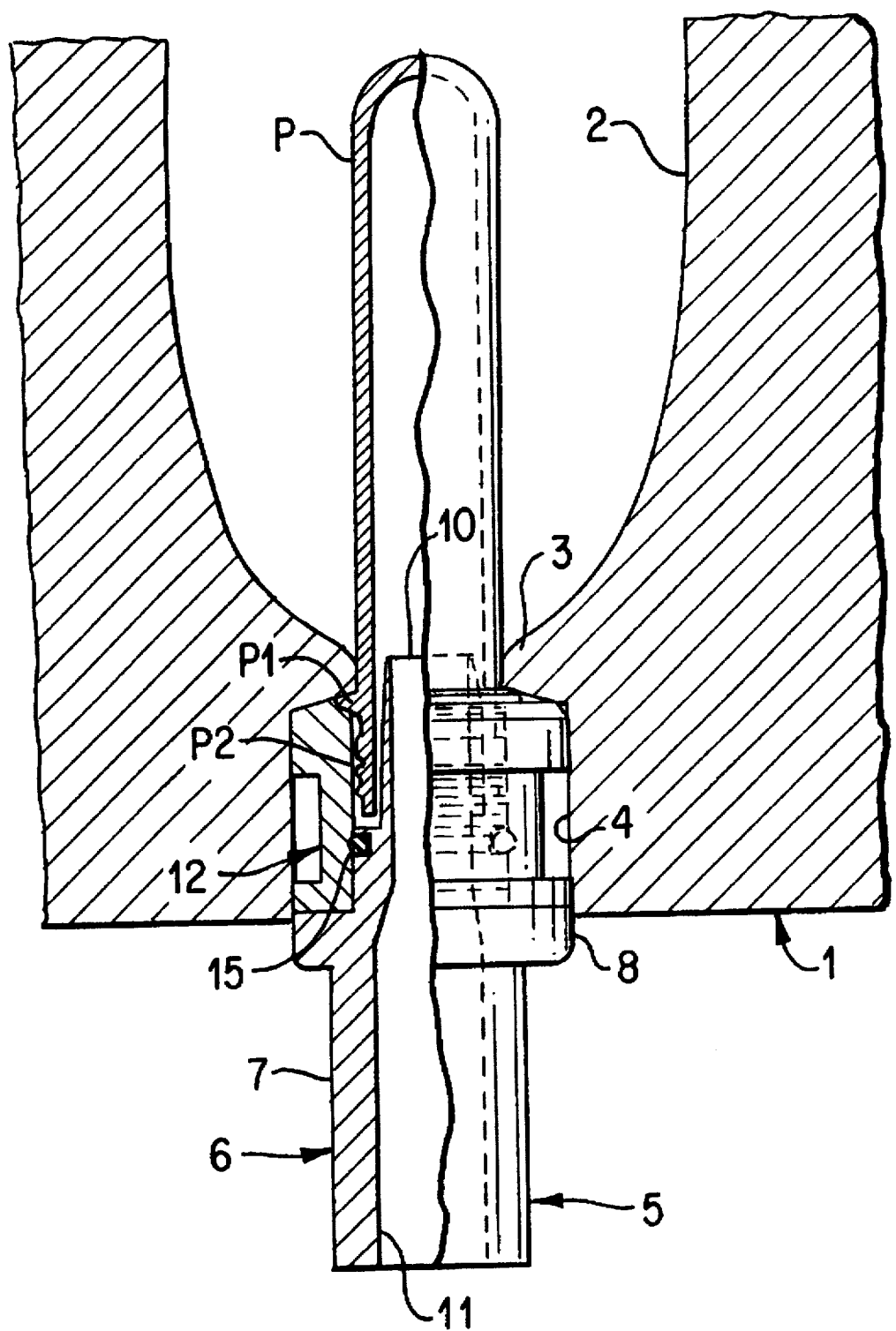
FIG. 1 is a front view of left half of a first embodiment of the present invention with a holding jig and a preform installed into the blow metal mold.
Figure 2:
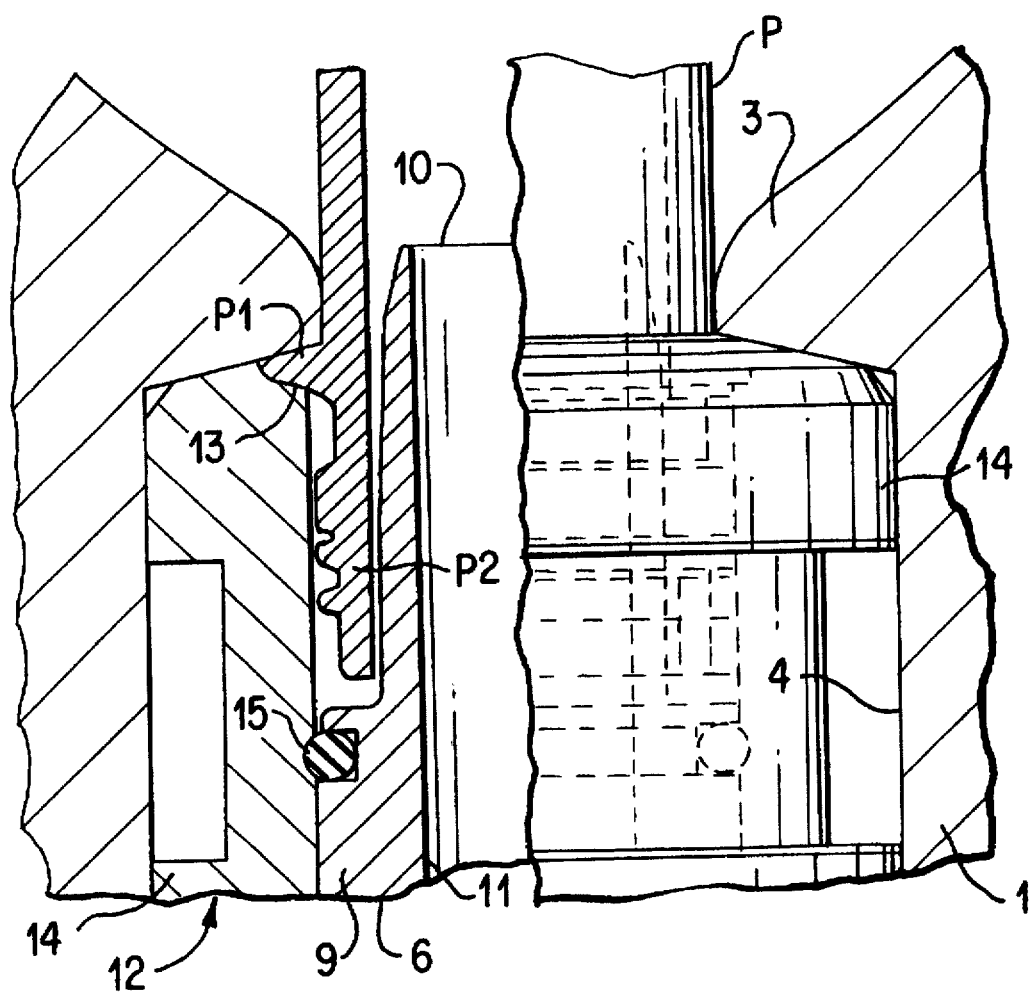
FIG. 2 is an enlarged view of key components of the first embodiment of the present invention as shown in FIG. 1.

The first embodiment of the present invention will be described with reference to FIGS. 1 and 2 below.

A holding jig 5 comprises a cylindrical jig body 6 and a holding cylinder 12. A blow metal mold 1 is a split mold, having a cavity 2 of the same shape as the container to be molded and an attaching concavity 4 for attaching the holding jig 5. The bottom of the attaching concavity 4 is connected with the cavity and has a neck supporting jaw 3. The holding jig 5 snugly fits into the attaching concavity 4 without any play.

A jig body 6 has a cylindrical grip portion 7 of relatively large diameter protruding downward, which attaches to the conveying device, not shown, or the like. The cylindrical grip portion 7 is connected with a fitting cylinder 9, having a slightly smaller outer diameter than that of the cylindrical grip portion 7, on the upper end thereof. The holding cylinder 12 is structured to attach to the fitting cylinder 9.

On an exterior surface, where the fitting cylinder 9 and the cylindrical grip portion 7 meet, there is a ring shaped outside jaw 8, the diameter of which is larger than that of the cylindrical grip portion 7 and the outer diameter of which is the same size as inner diameter of the attaching concavity 4 of the metal mold. Further, when the holding cylinder 12 is fitted over fitting cylinder 9, the insertion of the jig body 6 is limited by the outside jaw 8 coming into contact with the holding cylinder 12. On the upper end surface of the fitting cylinder 9, there is erected a guide cylinder 10, the outer diameter of which is smaller than the inner diameter of the cylindrical mouth portion P2 of the preform P. The center of guide cylinder 10, the fitting cylinder 9, and of the cylindrical grip portion 7 penetrated with an draw bar insertion hole 11 for an draw bar 16 to slide in and out.

The guide cylinder 10 of the jig body 6 attaches and retains the preform P to the holding jig 5 by guiding and appropriately fitting the cylindrical mouth portion P2 of the preform P.

For sure and smooth automatic fixing of the preform P to the holding jig 5, the surface of the upper end of guide cylinder 10 (upper end portion protruding upward from the holding cylinder 12) is tapered, with narrowing outer surface to the upper end.

The holding cylinder 12 surrounds the jig body 6, with its inner diameter wider than the outer diameter of the cylindrical mouth portion of the preform and smaller than the outer diameter of the neck ring. It also can house the cylindrical mouth portion of the upside-down preform and has a sealing brim 13 on which the neck ring of the preform sits. It is further devised that the air space inside and outside of the cylindrical mouth portion is kept connected even when the preform is fitted.

The holding cylinder 12 has guide jaws 14 formed around the top and bottom of the main cylindrical body, respectively, in such a size that the holding cylinder 12 tightly fits into the attaching concavity 4 of the blow metal mold 1. As the result, a ring-shaped cavity is formed around the holding cylinder 12.

The sealing brim 13 is located at the open top rim of the holding cylinder 12 like a groove ready to receive the neck ring of the preform. The reason for the sealing brim 13 of the holding cylinder 12 to be formed like a groove is as follows. When the holding jig 5 is attached to the blow metal mold 1, the neck ring P1 of the preform P is clasped by the neck supporting jaw 3 and the sealing brim 13 of the holding jig 5. The clasping strength created here can be controlled by the depth of the groove. As the result, incorrect deformation of the neck ring P1 due to too much clasping force can be prevented.

The clasping force of the neck ring P1 generated between the neck supporting jaw 3 and the sealing brim 13 should be just strong enough to push the neck ring P1 tightly to the sealing brim 13 and to seal the blow pressure. When the holding jig 5 is attached to the blow metal mold 1, the sealing brim 13 tightly touches the neck ring P1. Then, on condition that the neck ring P1 is pressed and deformed by the sealing brim 13 within the elastic or tolerable transformation range of the synthetic resin material, the upper surface of the holding cylinder 12 and comes in contact of the lower surface of the neck supporting jaw 3, in order that no more pressure will be applied to the neck ring, and any more attaching force of the holding jig 5 to the blow metal mold 1 is resisted by the neck supporting jaw 3.

The holding cylinder 12, with its bottom surface in contact with the outside jaw 8 of the jig body 6, attaches to the fitting cylinder 9 of the jig body 6 without any play. A seal ring 15 is disposed between the fitting cylinder 9 of the jig body 6 and the holding cylinder 12. The seal ring 15 seals any gap between the jig body 6 and the holding cylinder 12. When the holding cylinder 12 is attached to the jig body 6, the holding cylinder 12 is positioned so that the distance between the upper end of the fitting cylinder 9 and the seal brim 13 is greater than the height of the cylindrical mouth portion P2 of the preform P. As the result of this, when the preform P is attached to the holding jig 5, leaving the space inside of the cylindrical mouth portion still communicating with that of the outside, thereby securely forming a gap between the holding jig 5 and the cylindrical mouth portion P2 as a blow pressure passage.

According to the first embodiment of the present invention, the holding jig 5 is comprised of two parts, namely the jig body 6 and the holding cylinder 12. The holding jig 5 has complicated structure having a ring shape indentation wherein the cylindrical mouth portion P2 of the preform P fits between the guide cylinder 10 and the holding cylinder 12. However, dividing the holding jig into two parts makes the structure of the jig body 6 and the holding cylinder 12 simple, thereby making the machine work of the holding jig 5 simpler.

<Second Embodiment>

Figure 3:
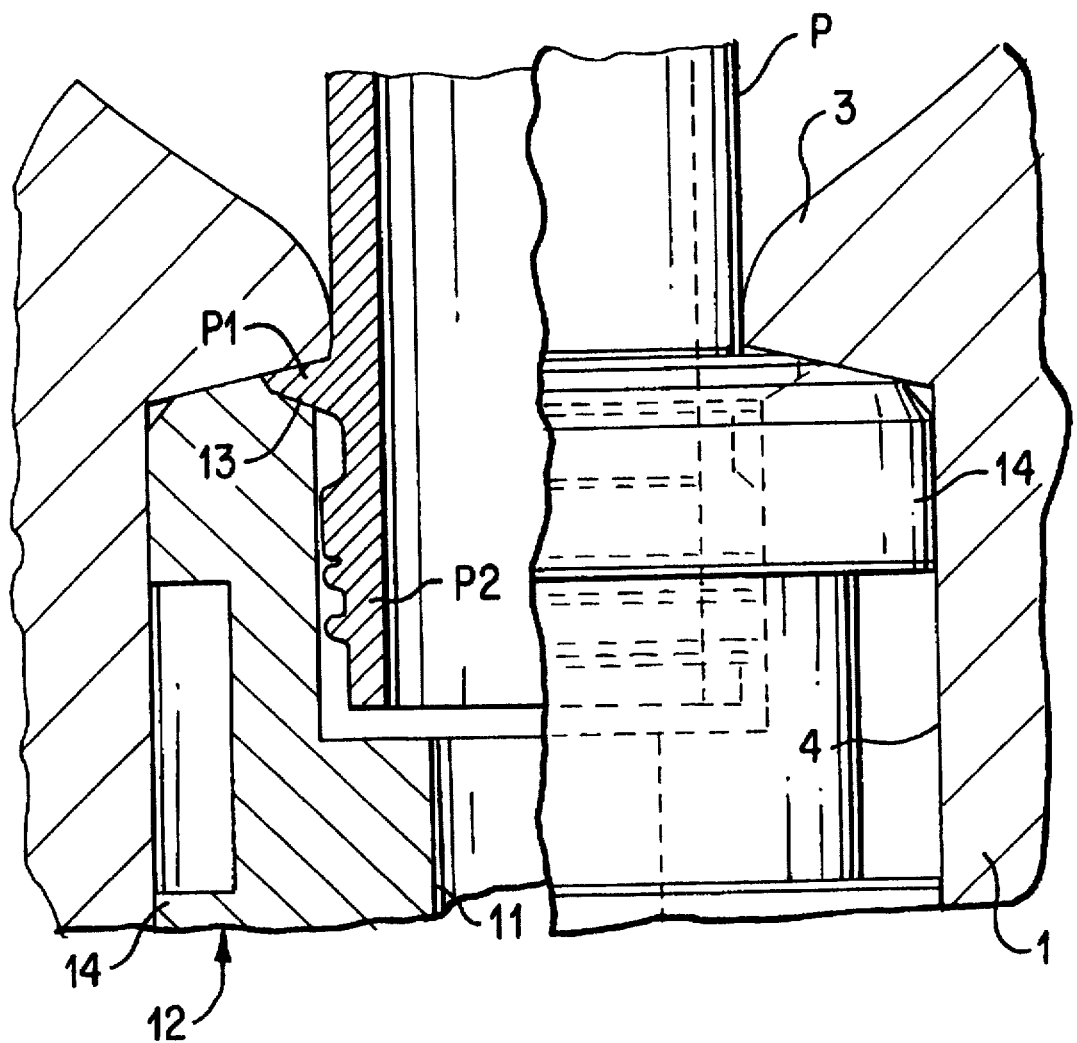
FIG. 3 is a view showing a second embodiment of the present invention.

The second embodiment of the present invention will be described with reference to FIG. 3.

In this embodiment, the guide cylinder 10 of the first embodiment is eliminated, and the jig body 6 and the holding cylinder 12 are combined as one unit.

Thus, the seal ring can be omitted, making the manufacturing process simpler.

Although there will not exist the guide cylinder 10 to support the preform by, the cylindrical mouth portion of the preform can still be loosely held by the inner surface of a holding cylinder in this second embodiment.

<Comparison Example>

Figure 4:
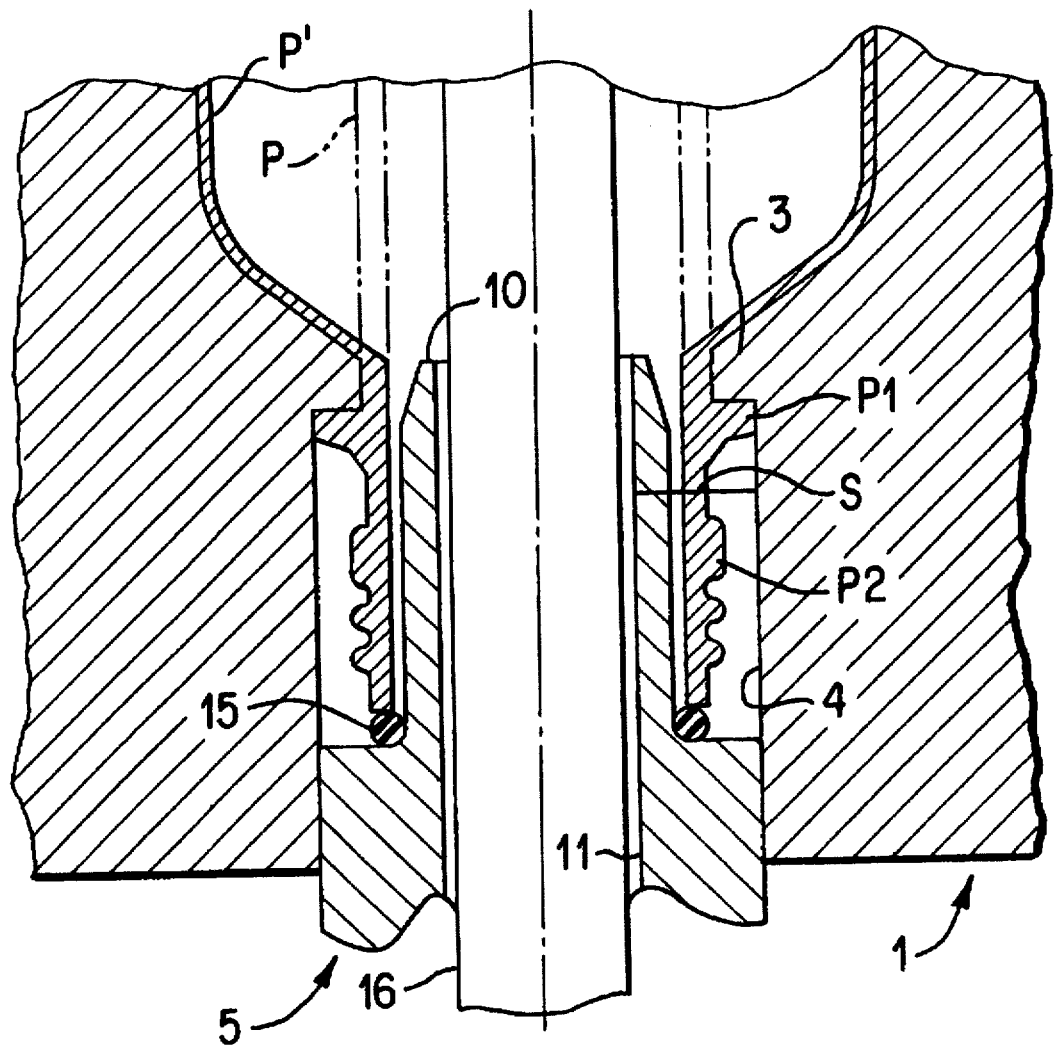
FIG. 4 is a longitudinal sectional view of one of the conventional embodiments.

A preform, the inner diameter of which cylindrical mouth portion is 21.74 mm and the thickness of the thinnest area s(see FIG. 4) of which grooved cylindrical mouth portion is 1.59 mm, is heated until the cylindrical mouth portion thereof becomes 60° C. Then the preform was molded into a bottle using the conventional biaxial oriented blow molding method, and was checked for any deformation of its cylindrical mouth portion.

Figure 5:
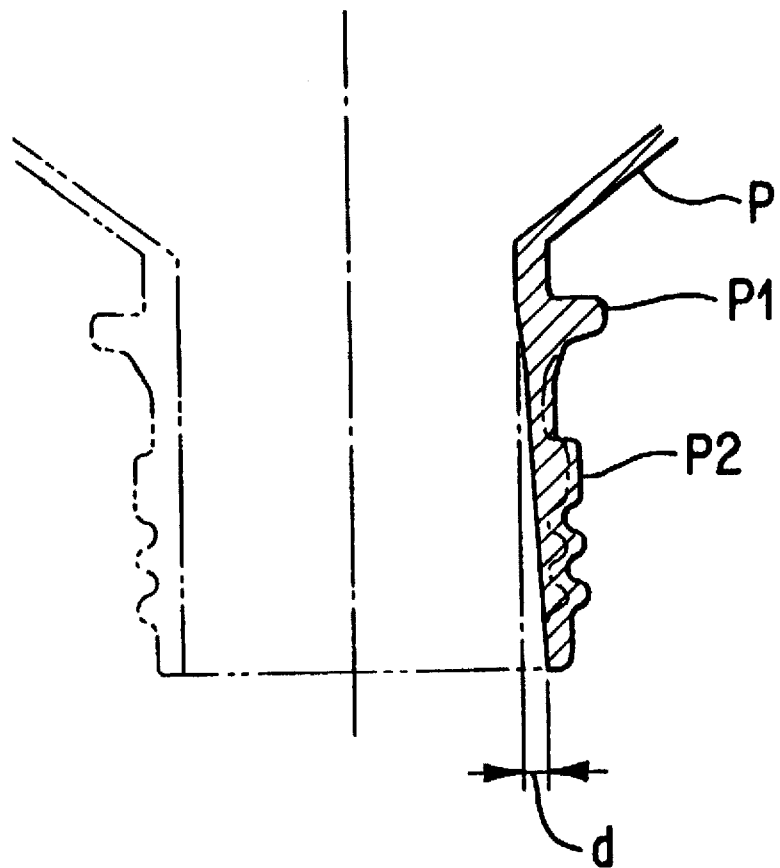
FIG. 5 is a view of a deformed cylindrical mouth portion molded with the conventional molding method.

As a result, expansion deformation of d=0.2 mm was detected after the bottle is formed, as shown in FIG. 5 The bottle was judged to be defective since the degree of deformation was not within the permissible range.

Industrial Applicability

The present invention with the above structure has the following effectiveness.

The enormous blow pressure, applied during blow molding, is evenly applied to the cylindrical mouth portion, thereby eliminating the possibility of expansion and deformation of the cylindrical mouth portion due to uneven pressure.

Therefore, the present invention allows production of bottles by biaxial oriented blow molding without any deformation of their cylindrical mouth portions, and introduces biaxial oriented blow molding method capable of molding bottles with highly exact dimension.

Blow pressure seal is achieved at the neck ring portion projecting around the preform, which is supported by the neck supporting jaw of the blow metal mold, the most reliable and stable blow pressure sealing can be achieved simply, firmly, and assuredly.

As the present invention arranges the pressure during the blow molding on the cylindrical mouth portion of the preform to be even throughout the cylindrical mouth portion portion, it eliminates any external force that deforms the cylindrical mouth portion. This permits the cylindrical mouth portion, having been made thick to resist the external force to create deformation, to be prepared as thin as possible. This, in turn, means saving of the synthetic resin material required for the molding of the bottles.

Further, the cylindrical mouth portion of the preform loosely fits into the holding cylinder which shields the radiation heat to the cylindrical mouth portion during the heating process, thereby maintaining the temperature of the cylindrical mouth portion lower and making it possible for the cylindrical mouth portion to resist deformation.

The present invention having the aforementioned effectiveness is thus highly useful in related industries.

What we claim is:

1. A method for forming a resin bottle, said method comprising the steps of:
   inserting a synthetic preform having a bottom, a neck portion and a cylindrical mouth portion into an opening of a metal mold;
   inserting a holding cylinder into said opening of said metal mold that contacts the preform within the metal mold;
   inserting a cylindrical jig body into the opening within the holding cylinder and beyond the neck portion of the preform;
   forming the bottle by biaxial orientation blow molding the preform, said blow molding step including applying blow pressure to the preform; and
   evenly applying the blow pressure to at least an inside and an outside of the cylindrical mouth portion of the preform.

2. A method according to claim 1, wherein said preform has a neck ring around the lower portion of the cylindrical mouth portion as an integral part, and the blow pressure acting on said preform is sealed at the neck ring during the blow molding step after the preform is installed into the metal mold.

3. In combination, a metal mold and a preform holding jig for biaxial orientation blow molding, which is used to hold a synthetic resin preform comprising a bottom, a cylindrical mouth portion, and a neck ring surrounding a lower part of the cylindrical mouth portion, and to attach the preform to the metal mold for biaxial orientation blow molding, wherein the preform holding jig comprises:
   a cylindrical jig body with a draw bar insertion hole penetrating in the center thereof for allowing the draw bar to slide up and down, and
   a holding cylinder vertically positioned within the metal mold and surrounding the jig body, in which the cylindrical mouth portion of the perform can be loosely fitted upside down, having a sealing brim which comes into contact with and supports the neck ring of the preform, and is shaped in a way to keep the air inside and outside of the cylindrical mouth portion free to communicate.

4. A metal mold and preform holding jig for biaxial orientation blow molding according to claim 3, wherein the seal brim is located at an open top rim of said holding cylinder.

5. A metal mold and preform holding jig for biaxial orientation blow molding according to claim 3, wherein the seal brim defines a groove to accommodate the neck ring.

6. A metal mold and preform holding jig for biaxial orientation blow molding according to claim 3, further comprising a guide cylinder erected on the holding jig in a shape to extend the draw bar insertion hole upward.

7. A metal mold and preform holding jig for biaxial orientation blow molding according to claim 6, wherein the guide cylinder has an outer diameter smaller than the inner diameter of the cylindrical mouth portion of the preform, and is high enough to project upward out of the holding cylinder.

8. A metal mold and preform holding jig for biaxial orientation blow molding according to claim 3, wherein the holding cylinder is formed separately from the jig body and attaches to the jig body on its outside, and any gap between the jig body and the holding cylinder is sealed airtight by a seal ring.

9. A metal mold and preform holding jig for biaxial orientation blow molding according to claim 3, wherein the jig body and the holding cylinder are formed as one unit.

* * * * *